US007801769B1

(12) United States Patent
Kelly et al.

(10) Patent No.: US 7,801,769 B1
(45) Date of Patent: Sep. 21, 2010

(54) COMPUTING A SET OF K-BEST SOLUTIONS TO AN AUCTION WINNER-DETERMINATION PROBLEM

(75) Inventors: Terence Kelly, Palo Alto, CA (US); Kemal Guler, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1218 days.

(21) Appl. No.: 11/232,518

(22) Filed: Sep. 22, 2005

(51) Int. Cl.
*G06Q 30/00* (2006.01)
(52) U.S. Cl. .............................. 705/26; 705/1; 705/27; 705/37; 705/80
(58) Field of Classification Search ................... 705/1, 705/26, 37, 80, 27
See application file for complete search history.

(56) References Cited

U.S. PATENT DOCUMENTS

| 6,952,682 | B1 * | 10/2005 | Wellman ...................... 705/37 |
| 2002/0152182 | A1 * | 10/2002 | Kashima et al. ............... 705/80 |
| 2008/0063141 | A1 * | 3/2008 | Luan et al. .................... 378/65 |

OTHER PUBLICATIONS

Ahuja, R. et al., "Network Flows", 1993, p. 106-107, Prentice Hall, Upper Saddle River, NJ.
Andersson, A. et al., "Integer Programming for Combinatorial Auction Winner Determination", Computing Science Dept. Information Technology, Uppsala Univ. downloaded Sep. 22, 2005.
Bender, E. et al., "Foundations of Applied Combinatorics", 1991, p. 31-33, Addision-Wesley Publishing Company.
Eppstein, D., "Finding the k Shortest Paths", Mar. 1997, Dept. of Information and Computer Science, Univ. of CA, Irvine, CA.
Feller, W., "An Introduction to Probability Theory and Its Applications", 1970, p. 38-39, vol. 1, John Wiley & Sons, Third Edition.
Hadjiconstantinou, E. et al., "An Efficient Implementation of an Algorithm for Finding K Shortest Simple Paths", Networks, 1999, vol. 34, Iss. 2, Abstract only.
Kellerer, H. et al., "Knapsack Problems", 2004, p. 1-5, 20-26, Springer.
Kelly, T., "Generalized Knapsack Solvers for Multi-Unit Combinatorial Auctions: Analysis and Application to Computational Resource Allocation", Feb. 2004, HP Laboratories.
Kelly, T. et al., "Relaxation Criteria for Iterated Traffic Simulations", 1998, vol. 9, International Journal of Modern Physics C, World Scientific Publishing Company.
Kelly T., "Utility-Directed Allocation", Jun. 2003, HPL-2003-115, HP Laboratories Palo Alto.
Perko, A., "Implementation of Algorithms for K Shortest Loopless Paths", Networks, 1986, p. 149-160. vol. 16, John Wiley & Sons.

* cited by examiner

*Primary Examiner*—Yogesh C Garg

(57) ABSTRACT

A method of computing at least one solution to an auction winner-determination problem includes receiving a plurality of bids in an auction and computing at least one solution to an auction winner-determination problem for the auction using the plurality of bids.

30 Claims, 6 Drawing Sheets

COMPUTING A SET OF K-BEST SOLUTIONS TO AN AUCTION WINNER-DETERMINATION PROBLEM

BACKGROUND

Auctions traditionally include the sale of goods from a seller to a buyer. A typical auction includes multiple buyers bidding on a good, referred to as a forward auction. However, one type of auction is a reverse auction or procurement auction, in which multiple sellers compete to sell goods to a single buyer. Often, the buyer will expend a significant amount of resources, including time, money and other resources, to obtain the desired goods at a procurement auction. For example, the buyer needs 10 lots of item X, 15 lots of item Y, and 20 lots of item Z. The buyer receives 5 bids from sellers A-E to deliver item X, another 5 bids from sellers F-J to deliver item Y, and still another 5 bids from sellers K-O to deliver item Z. With a total of 15 bids for items X, Y and Z, the buyer is faced with a costly and time-consuming process for selecting the bids for satisfying the buyer's requests for items X, Y and Z. Because of the time and costs required, typical procurement auctions do not provide an efficient mechanism for selecting bids in a timely and cost-effective manner. Typical auctions also do not provide a mechanism for handling constraints or bundles of constraints, including arbitrary constraints and constraints that are difficult to articulate.

BRIEF DESCRIPTION OF THE DRAWINGS

Embodiments are illustrated by way of example and not limitation in the accompanying figures in which like numeral references refer to like elements, and wherein.

DETAILED DESCRIPTION

Figure 1:
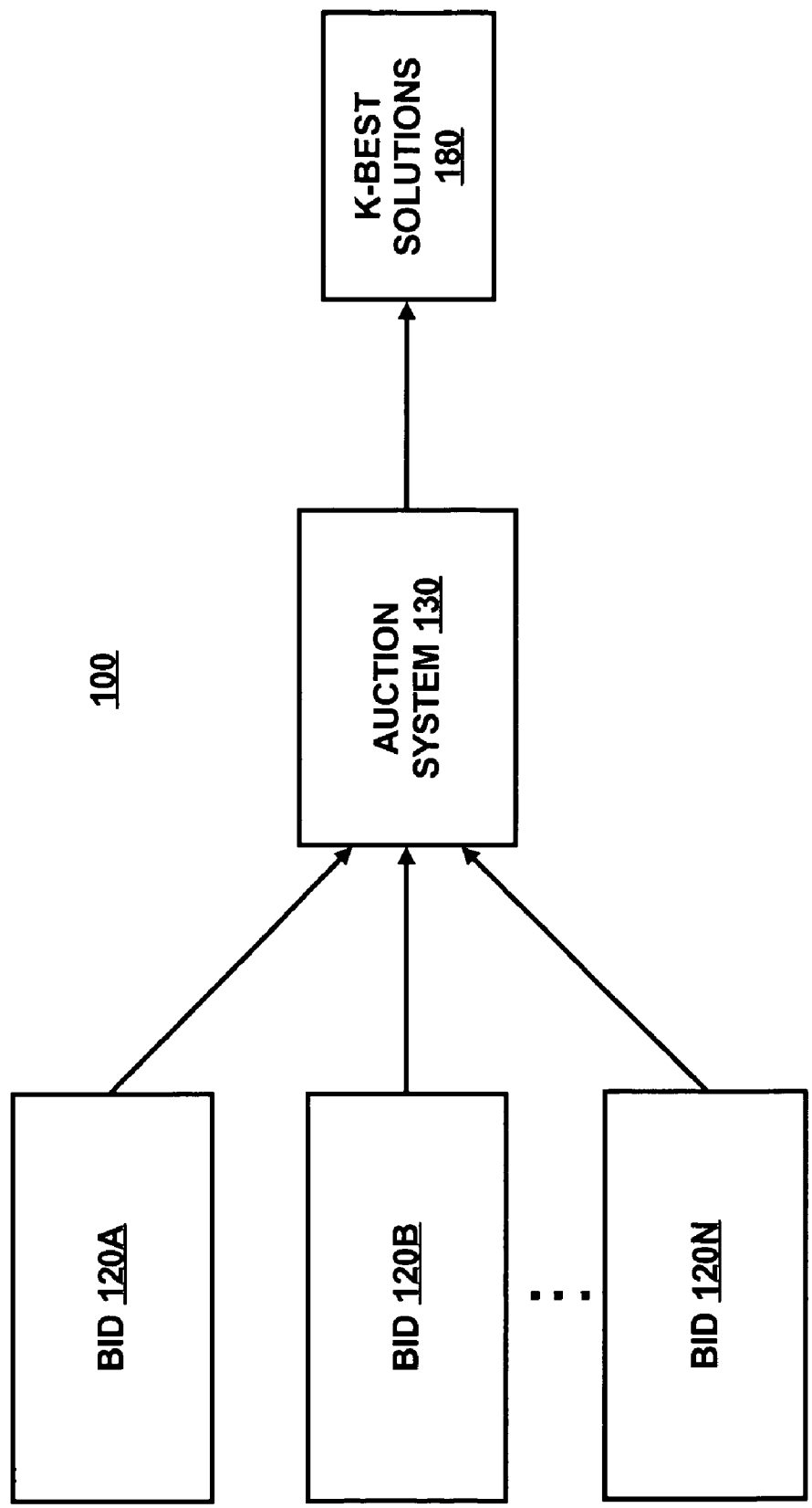
FIG. 1 shows a system for determining a set of K-best solutions to an auction winner determination problem, according to an embodiment.

For simplicity and illustrative purposes, the principles of the embodiments are described. However, one of ordinary skill in the art would readily recognize that the same principles are equally applicable to, and can be implemented with, variations that do not depart from the true spirit and scope of the embodiments. Moreover, in the following detailed description, references are made to the accompanying figures, which illustrate specific embodiments.

Several terms are used to describe the different embodiments. For clarity, a glossary of the terms and their corresponding definitions are provided below.

An auction is a means whereby agents exchange goods according to systematic rules of interaction.

Examples of goods include the following: material things, for instance, paintings, computer cooling fans; services, such as a contract to provide janitorial service for a stated period of time; agreements, for instance, agreements to enter into business relationships; financial instruments, such as stocks or bonds; any other entity that may be owned or traded; undesirable things ("bads"), for instance, chemical waste that one must dispose of, or onerous responsibilities that one might prefer others to assume.

An agent is a participant in an auction. Examples of agents are individual persons, firms, governments, or any other entity that owns and exchanges goods and services and enters into agreements. An agent in an auction, for example, is a buyer, a seller, or both. Computer systems and/or person(s) performing decision-making tasks may be the agents.

An agent's bid is its input to an auction. In one instance, a bid is expressed as an amount of money that the agent is willing to pay or the amount that the agent demands to be paid for each outcome that is possible in the auction. For example, an agent demands to be paid $2 per quart to properly dispose of someone else's used motor oil. A bid, for example, specifies a set of mutually exclusive outcomes, each with an associated willingness to pay. In such cases it is understood that at most one of these outcomes will occur. "Selecting a subset of winning bids" refers to selecting, at most, one of the mutually exclusive outcomes in each agent's bid. For example, a broker agent who possesses four pork bellies at the outset of an auction submits a bid that expresses a willingness to sell three of these, and also a willingness to purchase seven additional pork bellies, but not a willingness to buy or sell any other quantity. Such a bid is encoded as a set of (quantity, price) pairs, in which each (quantity, price) pair expresses the price the agent is willing to pay to obtain the corresponding quantity of pork bellies. Negative prices indicate demand or amount to be paid, and negative quantities indicate sales rather than acquisitions. For example, the bid "$\{(-3, \$-5), (7, \$9)\}$" may indicate that the agent demands $5 in exchange for three of its pork bellies, and is willing to pay $9 to acquire seven additional pork bellies. Auction rules may require that an additional "(0, $0)" pair be implicitly present in every bid, indicating that the agent will neither buy nor sell any goods, in which case the agent will neither gain nor lose money.

Seller bids in a procurement auction may express volume discounts and/or volume surcharges. The former charge less per unit for larger purchases and the latter charge more per unit for larger purchases. For example, the bid "$\{(-5, \$-5), (-10, \$-9), (-15, \$-20)\}$" offers a volume discount for purchasing 10 units instead of 5 but imposes a volume surcharge for purchasing 15 units instead of 10 or 5. The quantity-price, bid pairs are shown as negative amounts because negative prices indicate, for example, amount to be paid, and negative quantities indicate sales rather than acquisitions. Other protocols may be used to express bids.

Auction rules determine the outcome of an auction based on submitted bids and possibly other information, such as side constraints. The winner determination problem (WDP) of an auction, referred to as the auction WDP, is the computational problem of applying the auction rules to given input bids and determining a final disposition of goods.

A solution to the auction WDP may include a subset of submitted bids, such as in the case of a procurement auction, or a single bid, such as in the case of an auction where a seller is receiving bids, each bid including a purchase price for a good being sold by the seller. If the auction WDP is formulated as a mathematical programming problem, a solution may be an assignment of values to the decision variables. A solution to the auction WDP may also specify or entail additional information, such as monetary payments among agents. The auction WDP may be expressed as an optimization problem in which one seeks to optimize an objective function.

An objective function is a function that associates a scalar number with every solution to the auction WDP. For example, our objective function may be the total monetary gains that accrue to all agents as a result of changing the ownership of goods through the auction, and this objective function, for example, is maximized. In another example, the objective function in a procurement auction may be the buyer's total expenditure, and this objective function is minimized.

Constraints restrict the solutions to an auction WDP.

Particular types of constraints are described below.

A fundamental constraint is a constraint that follows from "mass conservation" and similar principles. For example, it is a fundamental constraint that no agent may purchase at an auction more units of a good than are offered for sale at that auction.

A side constraint is a constraint that is not fundamental but that is imposed nonetheless. For example, a buyer in a procurement auction may require that at least two and at most four sellers supply goods, even though solutions exist in which fewer than two or more than four sellers satisfy the buyer's demand.

A soft constraint is a side constraint that an agent may be willing to relax. For example, the buyer in a procurement auction may wish to acquire goods from at most four sellers, but may be willing to allow five sellers to supply goods if substantial savings would result.

A linear constraint is a constraint that can be expressed as a linear inequality in a mathematical optimization problem corresponding to the auction WDP. For example, the constraint that no seller in a procurement auction may supply more than 30% of an item is a linear constraint.

A constraint that does not come within the metes and bounds of the definition of a linear constraint is a non-linear constraint. For example, a natural business requirement such as "supplier a's share of item 1 among all suppliers of item 1 located in the same geographic area, such as Europe, should be no less than his share of item 2 among the suppliers of item 2 from the same region" can only be expressed as a nonlinear constraint on the allocations.

Several categories of solutions to an auction WDP may exist, with reference to the objective function and the above types of constraints:

A relaxed solution, for instance, a solution to the auction WDP ignoring side constraints, satisfies only fundamental constraints but not side constraints. The relaxed K-best solutions is a "K" number of solutions, for example, that best satisfy an objective function.

A feasible solution satisfies all constraints that are present, both fundamental constraints and side constraints.

An optimal solution is a solution that is optimized for the objective function of the auction WDP. For example, the objective function is to lower the buyer's costs, and the optimal solution is a solution that requires the buyer to pay the least amount for desired goods when compared to other possible solutions. It should be noted that an optimal relaxed solution may not necessarily be inferior to an optimal feasible solution and in some instances may be superior to an optimal feasible solution.

In a procurement auction, the difference in seller expenditure between an optimal relaxed solution and an optimal feasible solution, where the latter is feasible with respect to a given bundle of side constraints, is the price of the bundle of side constraints. The price of a bundle of side constraints may be more generally defined as a difference between the objective function value of an optimal relaxed solution and that of an optimal feasible solution.

For purposes of illustration, a sealed-bid auction is one type of auction where each agent submits a bid. An auction algorithm then computes a solution to the auction WDP that determines a final disposition of goods, such as a final disposition in which agents are awarded possession of the goods and possibly also monetary transfers among the agents. In a sealed-bid auction, agents do not observe one another's bids, and the overall procedure is executed only once, and thus the overall procedure does not iterate. An example of an auction that is not a sealed-bid auction is an English open-outcry auction, in which a crier announces a price and then raises the price as bidders accept the current price. In the English open-outcry auction, agents learn the bids of other agents, and the process of reaching a final outcome involves iteration of a basic cycle of announce price/accept price.

A procurement or reverse auction is an auction in which a single buyer seeks to acquire goods from several sellers. For example, the buyer wishes to acquire specific quantities of each of several items, wherein an item is a type of a good. For example, the items are computer CPUs and computer cooling fans, and the buyer wishes to acquire 10,000 CPUs and 8,000 cooling fans. The buyer is furthermore willing to acquire units of any one item from more than one supplier. For example, the buyer is willing to acquire 2,500 CPUs from one supplier and 7,500 CPUs from another supplier.

The buyer in a procurement auction may restrict the number of possible ways in which its overall demand is satisfied by insisting that any one supplier provide a fraction $0/Q$, $1/Q$, or $2/Q$, etc. of the buyer's total demand for each item, where Q is a positive integer. For example, if $Q=4$, the buyer insists that any given supplier sells exactly 0%, 25%, 50%, 75%, or 100% of the buyer's total demand. $1/Q$ is referred to as one quantile. For example, if $Q=2$, the buyer wishes to acquire two quantiles of the item.

For purposes of illustration, an example of a procurement auction is described in which a buyer wishes to acquire Q quantiles of each of several items. In the context of this instance of a procurement auction, the following definitions apply:

A solution to the auction WDP is an assignment of non-negative quantiles of each item to each seller, for instance, "for item X, seller A will supply zero quantiles, B will supply two quantiles, and C will supply five quantiles."

An acceptable solution is a solution in which the sum over all sellers of assigned quantiles is exactly Q, which means that the buyer acquires exactly Q quantiles of each item in an acceptable solution.

The definitions of relaxed solution, feasible solution, and optimal solution remain unchanged in the case of a procurement auction. In addition, a solution can be a feasible solution, such that the solution satisfies all given fundamental and side constraints, without being an acceptable solution.

A knapsack problem is any one of a large class of knapsack problems that formalize situations in which, given a set of objects, it is desired to select an optimal subset of the objects. In one example of a knapsack problem, each object has an associated "weight" and "profit", and a container is filled with a subset of objects whose sum of profits is greatest, subject to the constraint that the sum of object weights does not exceed the weight capacity of the container.

Many knapsack problems correspond to dynamic programming problems and, consequently, dynamic programming methods are operable to be used to solve knapsack problems. Dynamic programming involves solving a problem by decomposing the problem into smaller problems and solving the smaller problems optimally. An optimal solution to the overall problem consists of optimal solutions to the smaller constituent problems. For example, a fastest path between New York and Los Angeles on an Interstate highway system may pass through Oklahoma City. If so, the fastest path from New York to Los Angeles consists of the fastest path from New York to Oklahoma City followed by the fastest path from Oklahoma City to Los Angeles. For any dynamic programming problem there exists a corresponding shortest paths problem whose solution yields a solution to the dynamic programming problem.

A shortest paths problem is one of several problems of computing a shortest, or longest, path in a directed or undirected graph. In one embodiment, in a shortest paths problem, a directed or undirected graph and designated source and destination nodes are given. For example, a path is computed, which is defined as a sequence of edges, that connects the source node with the destination node and whose length, which is defined as the sum of constituent edge lengths or edge weights, is shortest or longest. As illustrated by the example in the previous paragraph, many types of shortest paths problems may be solved by dynamic programming.

A K-shortest paths (KSP) problem is one type of a shortest-paths problem. In a KSP problem, the shortest path between a source node and a destination node is computed. Also, the second shortest, third shortest, etc., up to some given number K of desired paths are computed. In other types of KSP problems, paths are generated in ascending order of length until path length exceeds a specified threshold. In still other types of KSP problems, as many paths as possible are generated, until, for example, the computational resources that are available are exhausted.

Auctions provide a format in which buyers and sellers may purchase and sell goods. Both the buyers and sellers may find it difficult to determine the best approach for achieving their goals at an auction. In a procurement auction, for example, a buyer seeks to acquire goods typically from multiple sellers but goods may also be acquired from a single seller. Each of the sellers submits a bid that offers to supply all or a part of the buyer's demands for each type of goods. The problem of selecting a subset of bids as a winner of the auction that satisfy the buyer's demands and that also minimizes total expenditure is an example of an auction WDP.

According to an embodiment, an auction WDP is determined to be similar to a knapsack problem. Because knapsack problems are known to be solved by dynamic programming methods, the auction WDP is solved by dynamic programming methods according to an embodiment.

Knapsack problems correspond to dynamic programming problems and, consequently, dynamic programming methods are operable to be used to solve knapsack problems. According to an embodiment, the auction WDP is formulated as a knapsack problem and the knapsack problem is formulated as a dynamic programming problem. The dynamic programming problem is then converted into a shortest paths problem. Then, a KSP algorithm is applied to the shortest paths problem to determine K-shortest paths in a graph that correspond to the K-best solutions to the auction WDP. Thus, the problem of computing K-best solutions to an auction WDP is converted to a problem of computing K shortest paths in a particular graph.

In one example, there are several paths in a graph between a source node and a destination node, and each path corresponds to a solution to the auction WDP. The graph is constructed so that the shortest path is the optimal relaxed solution to the auction WDP, for instance, the optimal solution to the auction WDP with no side constraints. The graph may be a directed acyclic graph (DAG) as is known in the art. A KSP algorithm is used to compute several of the shortest paths in the graph, which represent the set of best solutions to the relaxed WDP. The K-best solutions to a procurement auction WDP, for instance, correspond to the K-cheapest solutions for the buyer at the auction.

According to an embodiment, pre-processing of the shortest paths problem corresponding to the auction WDP is performed to diversify the set of K-best solutions. In one embodiment, pre-processing includes analyzing a plurality of edges of a graph, reducing or eliminating one or more of the edges of the graph, and generating the enumerated set of K-best solutions based on the reduced number of edges of the graph.

According to an embodiment, a recursive algorithm is used during the pre-processing to selectively or exhaustively enumerate solutions to sub-problems. In another embodiment, an equivalent non-recursive algorithm is used for the same purpose. For instance, in the context of a procurement auction in which several different types of items are sought by the buyer, a recursive algorithm is applied to generate a set of individual-item sub-auction solutions for each of a plurality of individual-item sub-auctions. Each of the set of individual-item sub-auction solutions corresponds to an edge of the graph in which the K-shortest paths are computed, and a length of each edge represents a cost associated with each corresponding individual-item sub-auction solution. During pre-processing, at least one of the individual-item sub-auction solutions may be eliminated, such that the graph includes a reduced number of the individual-item sub-auction solutions. The enumerated set of K-best solutions is generated based upon the reduced number of individual-item sub-auction solutions.

The K-best solutions generated by the KSP algorithms does not take into account side constraints. Instead, the KSP algorithms generate a plurality of relaxed K-best solutions to the auction WDP with no side constraints. The agent, for example, then selects at least one of the relaxed K-best solutions that satisfies at least one side constraint, such as a linear constraint or a non-linear constraint. A solution among the K-best solutions that satisfies all side constraints as well as all fundamental constraints is a feasible solution. A constraint, for instance, is imposed by the agent such as the buyer at the auction. A constraint sometimes is difficult to articulate for the decision-maker, such as the statement "I know a good solution when I see one." A soft constraint described above in some examples is a constraint difficult to articulate. In one embodiment, if the decision-maker is unable to articulate a constraint, the decision-maker is informed of the price associated with various bundles of constraints. By handling constraints that are difficult to articulate, an advantage is provided over standard constrained optimization techniques. The decision-maker may also select at least one feasible solution from the enumerated K-best solutions.

Referring to FIG. 1, a system 100 is shown for receiving a plurality of bids 120, such as bids 120A-120N, in an auction, according to an embodiment. The system 100 includes an auction system 130 operable to receive the bids 120 and to process the bids 120 to determine a set of K-best solutions 180 to an auction WDP. Each of the bids 120 represents an agent's input to an auction. In one instance, each of the bids 120 is expressed as an amount of money that the agent is willing to pay or the amount the agent demands to be paid for each outcome that is possible in the auction. The K-best solutions 180 is a "K" number of solutions. Examples of solutions operable to be generated by the auction system 130 include relaxed K-best solutions, feasible solutions, optimal solutions and acceptable solutions.

In one embodiment, the K-best solutions 180 determined by the auction system 130 include relaxed K-best solutions, and a subset of the relaxed K-best solutions is selected as winners of the auction WDP. A selected bid is one or more of the bids 120 that satisfies a request to obtain or sell one or more goods at an auction. A request is a request for bids, such as a request for offers to purchase one or more goods, or a request for offers to sell one or more goods, such as a particular amount of one or more item types, at the auction. For example, a buyer in a procurement auction requests bids from sellers for goods the buyer wants to purchase. The request includes a request for 20 lots of an item. A selected bid is an offer to sell the 20 lots at a price that is accepted by the requestor.

In one example, a procurement auction or a reverse auction is initiated by a request from a single buyer to purchase multiple items. The multiple items include, for example, multiple item types where a particular number of items of each item type is being purchased. The request from the single buyer evokes bids from multiple sellers. For instance, during a procurement auction, a buyer submits a request. For example, the auction system 130 receives a request from a buyer for purchasing items at an auction.

In response to the buyer's request, each of a plurality of sellers submits a bid 120A, 120B . . . 120N to satisfy the buyer's request. For example, the auction system 130 transmits the request to a plurality of sellers known to provide the desired goods, and the auctions system 130 receives the bids 120 from the sellers for the goods. The buyer clears the procurement auction by selecting one or a subset of the bids 120A, 120B . . . 120N that satisfies the buyer's request, also referred to as an acceptable solution. In some examples, one or a subset of the bids 120A, 120B . . . 120N encode volume discounts or volume surcharges.

The auction system 130 is operable to determine the K-best solutions 180 for other types of auctions as well. For example, a forward auction includes interaction of a single seller with multiple buyers. In a forward auction, a bid includes an offer from a buyer to purchase one or more items at an auction. In another example, a bid includes one or more offers from one or more sellers to sell one or more items at an auction. In another example, a bid includes an offer from a buyer to purchase a plurality of items at an auction, or an offer from a seller to sell a plurality of items at an auction. One of ordinary skill in the art will recognize that agents also interact in other types of auctions, including for example a two-sided combinatorial exchange, a sealed-bid multi-unit combinatorial auction, or any other type of format or setting in which goods are exchanged between agents.

According to one embodiment, the auction system 130 computes the K-best solutions 180 to an auction WDP by formulating the auction WDP as a knapsack problem. The knapsack problem is, in turn, formulated as a dynamic programming problem and the dynamic programming problem is, in turn, formulated as a KSP problem. The KSP problem is then solved to determine the K-best solutions 180 to the auction WDP.

Figure 2:
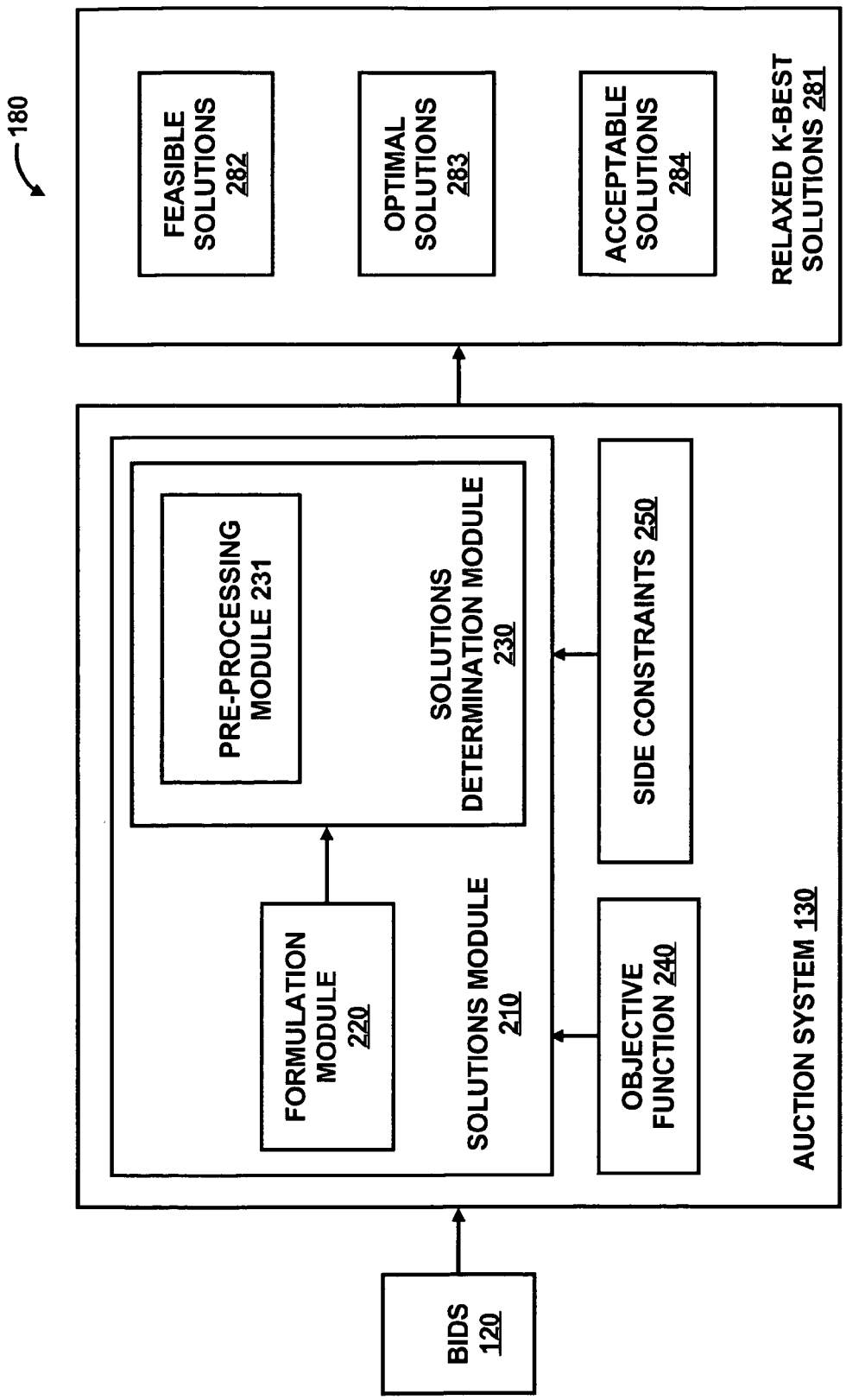
FIG. 2 shows an example of a system for determining a set of K-best solutions to an auction winner determination problem, according to an embodiment.

Referring to FIG. 2, a more detailed depiction of the auction system 130 is shown. The bids 120 correspond to the plurality of bids 120A, 120B . . . 120N shown in FIG. 1. In some instances, the bids 120 include volume discounts or volume surcharges described in further detail below. The auction system 130 includes a solutions module 210 for determining the K-best solutions 180 to the auction WDP. The solutions module 210 receives information from at least one buyer, such as optionally receiving one or more of the objective function 240 and the constraints 250, and information from at least one seller, such as the bids 120 to determine the K-best solutions 180.

The solutions module 210 includes a formulation module 220 and a solutions determination module 230. The formulation module 220 performs several functions including, for instance, formulating the auction WDP as a knapsack problem, formulating the knapsack problem as a dynamic programming problem, and formulating the dynamic programming problem as a KSP problem.

Formulation involves an application or execution of at least one process that results in an expression of a problem, such as the mathematical expression of a KSP problem. The mathematical expression may be solved by one or more processes, such as application of a known KSP algorithm.

The solutions determination module 230 determines the K-best solutions 180 to the KSP problem formulated by the formulation module 220. For example, the solutions determination module 230 solves the KSP problem using a known KSP algorithm to determine the K-best solutions 180. The K-best solutions 180 is a set of K-best solutions and includes at least one solution. In one example, the set of K-best solutions comprises at least one solution to individual sub-auctions.

In one embodiment, the solutions determination module 230 includes a pre-processing module 231 for improving the usefulness of the K-best solutions 180. For example, the K-best solutions 180, in certain instances, are substantially similar and there are minor differences between each of the K-best solutions 180. The pre-processing module 231 determines the K-best solutions 180 such that the K-best solutions 180 represent a diverse set of solutions that an agent can select from. In one embodiment, the pre-processing module 231 uses a recursive algorithm to selectively or exhaustively enumerate a diverse set of K-best solutions. In another embodiment, an equivalent non-recursive algorithm is used for the same purpose.

In the case of a procurement auction, for instance, in which several different types of items are sought by a buyer, the pre-processing module 231 performs pre-processing by application of a recursive algorithm to generate a set of individual-item sub-auction solutions for each of a plurality of individual-item sub-auctions. The pre-processing module 231 eliminates at least one of the individual-item sub-auction solutions to enhance the diversity of the set of K-best overall WDP solutions. For example, solutions for one of the individual-item sub-auctions may be very similar, such as minimal differences in price, and thus results in each of the K-best solutions 180 being similar. One or more of the solutions for that individual item sub-auction are eliminated when determining the K-best solutions 180 in order to generate a set of diverse K-best solutions to the auction WDP.

In one embodiment, the solutions determination module 230 in the solutions module 210 determines the relaxed K-best solutions 281. The relaxed K-best solutions 281 include solutions to the auction WDP that do not satisfy or take into consideration side constraints. From the relaxed K-best solutions 281, the solutions determination module 230 is operable to determine one or more of feasible solutions 282, optimal solutions 283, and acceptable solutions 284, which are subsets of the relaxed K-best solutions 281. For example, the solutions determination module 230 takes into consideration at least one objective function 240 when determining the optimal solutions 283 and/or at least one side constraint 250 when determining the feasible solutions 282. Although not shown, the K-best solutions 180 and the relaxed K-best solutions 281 optionally include other types of solutions not shown. For example, the solutions determination module 230 determines optimal relaxed solutions, optimal feasible solutions, and optimal acceptable solutions, which include, respectively, solutions that are the best among all or a subset of the feasible solutions 282, solutions that are the best among all or a subset of the acceptable solutions 284, and solutions that are the best among all or a subset of the K-best relaxed solutions 281.

In one embodiment, the optimal solutions 283 are solutions determined from the relaxed K-best solutions 281 that optimize the objective function 240. For example, in the case of a procurement auction, the objective function 240, for example, includes minimization of a buyer's total expenditure for a bundle of goods, or the price that is required to obtain the bundle of goods. In another example, the objective function 240 includes the total monetary gains that accrue to all agents as a result of changing the ownership of goods through the auction, and this objective function 240, for example, is maximized. The solutions determination module 230 determines the optimal solution 283 that minimizes the buyer's total expenditure or that maximizes total monetary gains that accrue to all agents.

In one embodiment, the solutions determination module 230, in addition to or alternatively to considering the objective function 240, considers the side constraints 250. The side constraints 250 include a single side constraint or multiple side constraints. The feasible solutions 282 are solutions that satisfy the side constraints 250. The side constraints 250 restrict the K-best solutions 180 that are selected, for example, by a decision-maker. In another embodiment, after the solutions module 210 generates the relaxed K-best solutions 281, a decision-maker selects at least one of the relaxed K-best solutions 281 that satisfies the side constraints 250. A side constraint 250 in some instances is difficult for a decision-maker at an auction to articulate, such as the statement "I know a good solution when I see one." This type of side constraint, which is one example of a soft constraint, is considered by the decision-maker when selecting the feasible solution 282. The acceptable solutions 284 are a solution for a procurement auction where the buyer is able to acquire all the desired items, such as a solution in which the sum over all sellers of assigned quantiles is exactly Q and the buyer acquires exactly Q quantiles of each item in an acceptable solution. The feasible solutions 282 and/or the optimal solutions 283 can be the acceptable solutions 284.

Figure 3:
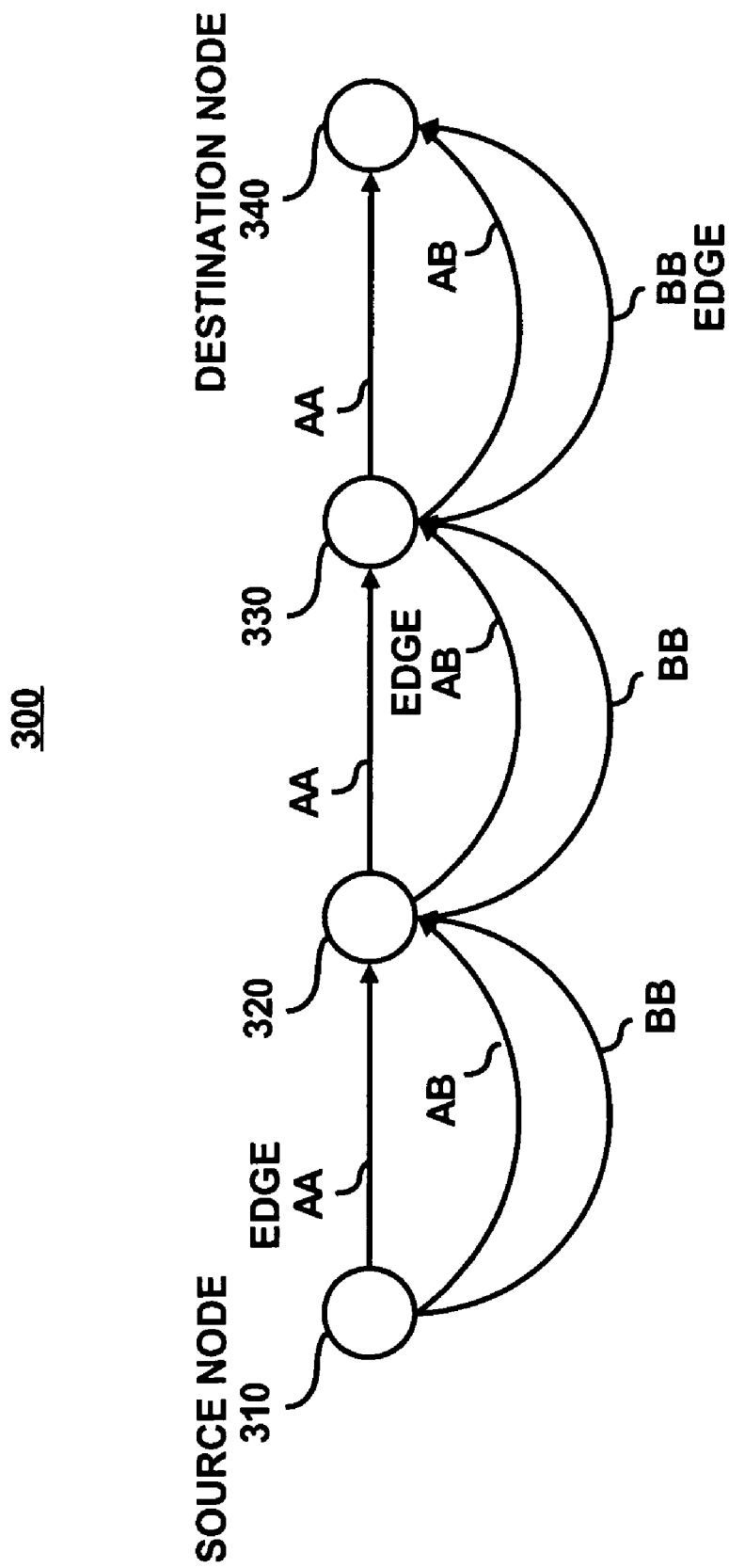
FIG. 3 shows an example of some solutions to a winner determination problem as paths in a graph, according to an embodiment.

As described above, a shortest paths problem is one of several problems of computing a shortest, or longest, path in a directed or undirected graph. FIG. 3 illustrates an example of a directed graph 300. According to an embodiment, the solutions determination module 230 receives information, such as information depicted in the graph 300, to determine the K-best solutions 180 to the auction WDP. In one example, K-best solutions 180 correspond to "K" shortest paths in the graph 300. Each path from a source node 310 to a destination node 340 in the graph 300 corresponds to a distinct solution to the auction WDP. The KSP problem involves finding K-shortest paths between two nodes, for example, computing K-shortest paths from the source node 310 to the destination node 340.

FIG. 3 depicts the source node 310, intermediate nodes 320 and 330, and the destination node 340. A graph, such as the graph 300, is defined as a set of nodes joined by links called edges. An edge is defined as a link between two nodes. The graph 300 includes the set of nodes 310, 320, 330 and 340, in which each set of nodes is joined by one or more of the edges labeled AA, AB and BB. An edge is associated with a bid 120, for example, the edge labeled AA between the node 310 and the node 320 is associated with a bid 120 submitted by a seller $S_A$ to supply 100% of a good, such as an item type X, to a buyer.

A path in the graph 300 is defined as a sequence of at least two nodes joined by at least one edge, such that from each node there is an edge to the next node. For example, one of the paths from the node 310 to the node 340 includes the three successive edges AA, including the first edge labeled AA between the node 310 and the node 320, the second edge labeled AA between the node 320 and the node 330, and the third edge labeled AA between the node 330 and the node 340. The first node in a path is the source node and the last node in the path is the destination node. The other nodes between the source node and the destination node are called intermediate nodes.

The problem of computing the K-best solutions 180 to a multi-item procurement auction, for example, maps onto the graph 300. In one embodiment, a single auction is represented as a plurality of individual-item sub-auctions for a plurality of items requested. Each individual good, such as an individual item, is purchased at the single auction but the purchase of each item is represented as a separate individual-item sub-auction. The bids 120 for one or more of the individual items being auctioned are received and processed by the auction system 130 to generate the K-best solutions 180 to the auction WDP.

A procurement auction, for example, is represented as a plurality of individual item sub-auctions. The solutions module 210 receives the plurality of bids 120. Each of the bids 120 is decomposed into components corresponding to individual item sub-auctions.

The individual solutions for one of the individual-item sub-auctions are represented by the edges labeled AA, AB and BB between the source node 310 and the intermediate node 320. The individual solutions for another individual-item sub-auction are represented by the edges from the intermediate node 320 to the intermediate node 330, etc. The length of an edge is the cost of the corresponding individual-item sub-auction solution. In one example, one or more shortest paths are optimal to a buyer or a seller because the one or more shortest paths represent the least costly solution, which is an example of the objective function 240 shown in FIG. 2.

In the procurement auction example, where the auction is represented as individual-item sub-auctions, the bids 120 are received by the solutions module 210 shown in FIG. 2. The output of the solutions module 210, and more particularly the solutions determination module 230, is the relaxed K-best solutions 181 for the auction WDP for the procurement auction. Each relaxed K-best solution 181 to an individual-item sub-auction corresponds to a set of bids 120.

Referring to Table 1, a procurement auction is depicted in which two sellers $S_A$ and $S_B$ submit corresponding bids 120A and 120B for three item types X, Y and Z requested by a buyer. For example, two sellers $S_A$ and $S_B$ submit corresponding bids 120A and 120B for the keyboards, the monitors, and the mice requested by the buyer. The buyer requests a particular number of lots of each item type, such as 10 lots of each of the keyboards, monitors and mice. In addition, as shown in Table 1, each of the bids 120A and 120B represents an offer by each of the corresponding sellers $S_A$ and $S_B$ to supply a percentage, such as 50% or 100%, of the number of lots of each of the item types X, Y and Z requested by the buyer for each individual-item sub-auction.

TABLE 1

The payments (p) required by the sellers $S_A$ and $S_B$ for supplying 50% or 100% of each of the item types X, Y and Z to the buyer, based on the corresponding bids 120A and 120B.

|  | 50% of item type X | 100% of item type X | 50% of item type Y | 100% of item type Y | 50% of item type Z | 100% of item type Z |
|---|---|---|---|---|---|---|
| Seller $S_A$ | p = 3 | p = 6 | p = 4 | p = 7 | p = 5 | p = 11 |
| Seller $S_B$ | p = 2 | p = 7 | p = 5 | p = 8 | p = 4 | p = 10 |

Let I denote the number of item types that the buyer requests at the procurement auction, such as I=3 for the keyboards, monitors and mice. The purchase of the requested lots of each item type is represented as a sub-auction, and I=3 also represents the number of individual-item sub-auctions in the overall procurement auction.

Let S denote the number of sellers. In this example, there are two sellers $S_A$ and $S_B$ (S=2) presenting competing bids 120A and 120B, respectively, to satisfy the buyer's request for the particular lots of each of the item types X, Y and Z, such as purchasing the number of requested lots for each of the item types X, Y and Z.

In addition, let Q denote the number of quantiles that each of the sellers $S_A$ and $S_B$ presenting the corresponding bids 120A and 120B will offer to supply to the buyer. A quantile is the fraction of the requested lots of each item type X, Y and Z that will be delivered to the buyer. As shown in Table 1, each of the bids 120A and 120B represents an offer by each of the corresponding sellers $S_A$ and $S_B$ to supply 50% or 100% of the number of lots of each of the item types X, Y and Z requested by the buyer. Because either 50% or 100% are offered for each of the item types X, Y and Z, in this example Q=2. If Q were instead equal to 4, the sellers would offer to supply 25%, 50%, 75%, or 100% of the number of lots demanded by the buyer.

In addition, for each particular item type X, Y and Z being auctioned, each of the bids 120A and 120B includes a payment (p, in dollar amounts) that each of the sellers $S_A$ and $S_B$ requires for supplying each possible number of quantiles (1 through Q) of the buyer's request for the requested lots of each item type; it is understood that if the seller supplies zero quantiles then the seller will receive no payment. For example, for the seller $S_A$ to supply 50% of the requested lots of the item type X to the buyer, the total payment p required by the seller $S_A$ is 3 dollars (p=3).

With regard to the payment p required, either of the sellers $S_A$ and $S_B$ may apply a volume discount, which corresponds to a reduction in the per-quantile payment required for supplying a greater quantity of the requested lots for one or more of the item types X, Y and Z. Alternatively, a volume surcharge may be applied, which corresponds to an increase in the per-quantile payment required for supplying a greater quantity of the requested lots for one or more of the item types X, Y and Z. A volume surcharge applies, for example, when a seller has a limited inventory and production capacity and the seller applies a higher price for supplying a particular amount of one or more of the item types X, Y and Z.

The solutions module 210 determines the K-best solutions 180 for the individual-item sub-auctions for the individual items X, Y and Z. Each K-best solution 180 to an individual-item sub-auction corresponds to a subset of submitted bids 120.

In the above example, there are a total of three individual-item sub-auction solutions for each individual-item sub-auction. For example, for one of the individual-item sub-auctions, the first individual-item sub-auction solution is where the buyer acquires 100% of the requested amount of each item type from seller $S_A$. The second individual-item sub-auction solution is where the buyer acquires 100% of the requested amount of each item type from seller $S_B$. The third individual-item sub-auction solution is where the buyer acquires 50% of the requested amount of each item type from seller $S_A$ and the other 50% from seller $S_B$. Three individual-item sub-auction solutions in each of the three sub-auctions indicate a total of $3^3=27$ solutions for the overall procurement auction.

Table 2 depicts the total number of overall procurement auction solutions, which consist of all combinations of the individual-item sub-auction solutions enumerated by the solutions module 210 for the individual-item sub-auctions for the item types X, Y and Z. According to an embodiment, all or many of the individual-item sub-auction solutions are determined by the solutions module 210 shown in FIG. 2.

The total number of overall procurement auction solutions in the example shown in table 2 is 27. The individual-item sub-auction solutions are encoded as two-character strings, in which the symbol "AA" indicates that seller $S_A$ supplies 100% of the requested amount of the particular item type X, Y or Z, "AB" indicates that each seller supplies 50% of the requested amount of the item type X, Y or Z, and "BB" indicates that seller $S_B$ supplies 100% of the requested amount of the item type X, Y or Z.

Table 2 also indicates the total payment ($\Sigma$p) associated with each individual-item sub-auction solution for the overall procurement auction. For example, in the case in which "AA" is listed for each of the item types X, Y and Z, seller $S_A$ supplies 100% of the requested amount of each of the three item types to the buyer. In this case, the total payment associated with seller $S_A$ supplying 100% of the requested amount of the each of the three item types is 24 dollars ($\Sigma$p=24). Table 2 also shows that the solution corresponding to AB AA AB, for example, requires a total payment to the buyer of 21 dollars. This solution, corresponding to AB AA AB, represents the minimal cost to the buyer for obtaining the requested amount of each of the three item types X, Y and Z. Finally, asterisks adjacent to total payments in Table 2 indicate the K-best relaxed solutions for K=10.

TABLE 2

Total number of solutions, as determined by the solutions module 210, and the corresponding total payment (Σp) associated with each solution. Asterisks (*) indicate the K-best relaxed solutions for K = 10.

| auction | | | | auction | | | | auction | | | |
|---|---|---|---|---|---|---|---|---|---|---|---|
| item type X | item type Y | item type Z | Σp | item type X | item type Y | item type Z | Σp | item type X | item type Y | item type Z | Σp |
| AA | AA | AA | 24 | AB | AA | AA | 23* | BB | AA | AA | 25 |
| AA | AA | AB | 22* | AB | AA | AB | 21* | BB | AA | AB | 23* |
| AA | AA | BB | 23* | AB | AA | BB | 22* | BB | AA | BB | 24 |
| AA | AB | AA | 26 | AB | AB | AA | 25 | BB | AB | AA | 27 |
| AA | AB | AB | 24 | AB | AB | AB | 23* | BB | AB | AB | 25 |
| AA | AB | BB | 25 | AB | AB | BB | 24 | BB | AB | BB | 26 |
| AA | BB | AA | 25 | AB | BB | AA | 24 | BB | BB | AA | 26 |
| AA | BB | AB | 23* | AB | BB | AB | 22* | BB | BB | AB | 24 |
| AA | BB | BB | 24 | AB | BB | BB | 23* | BB | BB | BB | 25 |

According to an embodiment, the buyer provides one or more side constraints 250 that determine which of the solutions will be selected. For example, if the buyer requires as a constraint 250 that the seller $S_B$ must supply at least 50% of the requested amount of each of the item types X, Y and Z, then the solution that provides the least cost for the buyer is AB BB AB which corresponds to a total payment (Σp) of 22 dollars. The price of this constraint 250 is therefore one dollar, because the total payment required by the buyer is one dollar higher (22 dollars) as compared to the solution corresponding to the least payment required (21 dollars).

In the example described above, I=3 is shown by way of example and not limitation. One of ordinary skill in the art will recognize that I includes, for example, any number of item types that the buyer requests at the procurement auction. In addition, the solutions module 210 is operable to determine any number of individual-item sub-auction solutions for any number of items, including any number of item types being auctioned, and in response to any number of the bids 120 that are received.

In one embodiment, the number of individual-item sub-auction solutions is determined by how many ways Q quantiles can be supplied by S sellers. In each individual-item sub-auction, each of the sellers $S_A$ and $S_B$ supplies between zero and Q quantiles of the item requested. The number of ways in which exactly Q quantiles can be supplied by S sellers is given by Equation 1:

$$R(S, Q) = (Q+S-1)!/[Q! \times (S-1)!]$$

For many situations, the number of ways in which exactly Q quantiles can be supplied by S sellers can be exhaustively enumerated. For example, if Q=10 quantiles, and S=12 sellers, then R(12, 10)=352,716. Equation 1 is used to provide the R(S, Q) number of acceptable solutions to an individual-item sub-auction, i.e., the number of solutions that supply exactly Q quantiles. By contrast, the number of individual-item sub-auction solutions to the individual-item sub-auctions, including solutions that do not supply exactly Q quantiles, is $(Q+1)^S$ because each seller may provide between zero and Q quantiles. Enumerating all $(Q+1)^S$ of these individual-item sub-auction solutions and then discarding all but those that supply exactly Q quantiles can be costly from a computational standpoint. The solutions module 210 can employ a procedure to enumerate only the R(S,Q) solutions that supply exactly Q quantiles.

Referring again to FIG. 3 and the example described above with respect to tables 2 and 3, the shortest path in the graph 300, which corresponds to the lowest overall cost as described above, corresponds to AB, AA, AB which has a total cost of 21 dollars for the buyer. The shortest path AB, AA, AB represents the minimal cost to the buyer for obtaining the requested amount of each of the three item types X, Y and Z. By comparison, the path AB BB AB is associated with a greater total cost of 22 dollars for the buyer.

A path in the graph 300, for example, which represents a directed acyclic graph (DAG), can be a loopless or directed acyclic path that does not include a loop or a cycle of one or more edges between nodes in the path. In the case of a DAG, the edges have directionality and there are no directed cycles or looping paths in the graph.

According to one embodiment, the pre-processing module 231 performs pre-processing of the KSP problem to determine the K-best solutions 180 by generation of a reduced graph. Generation of a reduced graph includes, in one instance, analyzing a plurality of edges of a graph whose shortest paths, for example, correspond to optimal solutions to the auction WDP, deleting one or more edges from the graph to form a reduced graph, and generating the K-best solutions 180 based on the reduced graph.

According to one embodiment, the pre-processing module 231 performs pre-processing by application of a recursive algorithm to generate a set of individual-item sub-auction solutions for each of a plurality of individual-item sub-auctions. Each of the set of individual-item sub-auction solutions corresponds to an edge of the graph, such as the graph 300, in which the K-shortest paths are computed, in which a length of each edge represents a cost associated with each corresponding individual-item sub-auction solution. After generating the set of individual-item sub-auction solutions for each of the plurality of individual-item sub-auctions, the pre-processing module 231 eliminates, for example, at least one of the individual-item sub-auction solutions, such that the graph includes a reduced number of the individual-item sub-auction solutions.

Figure 4:
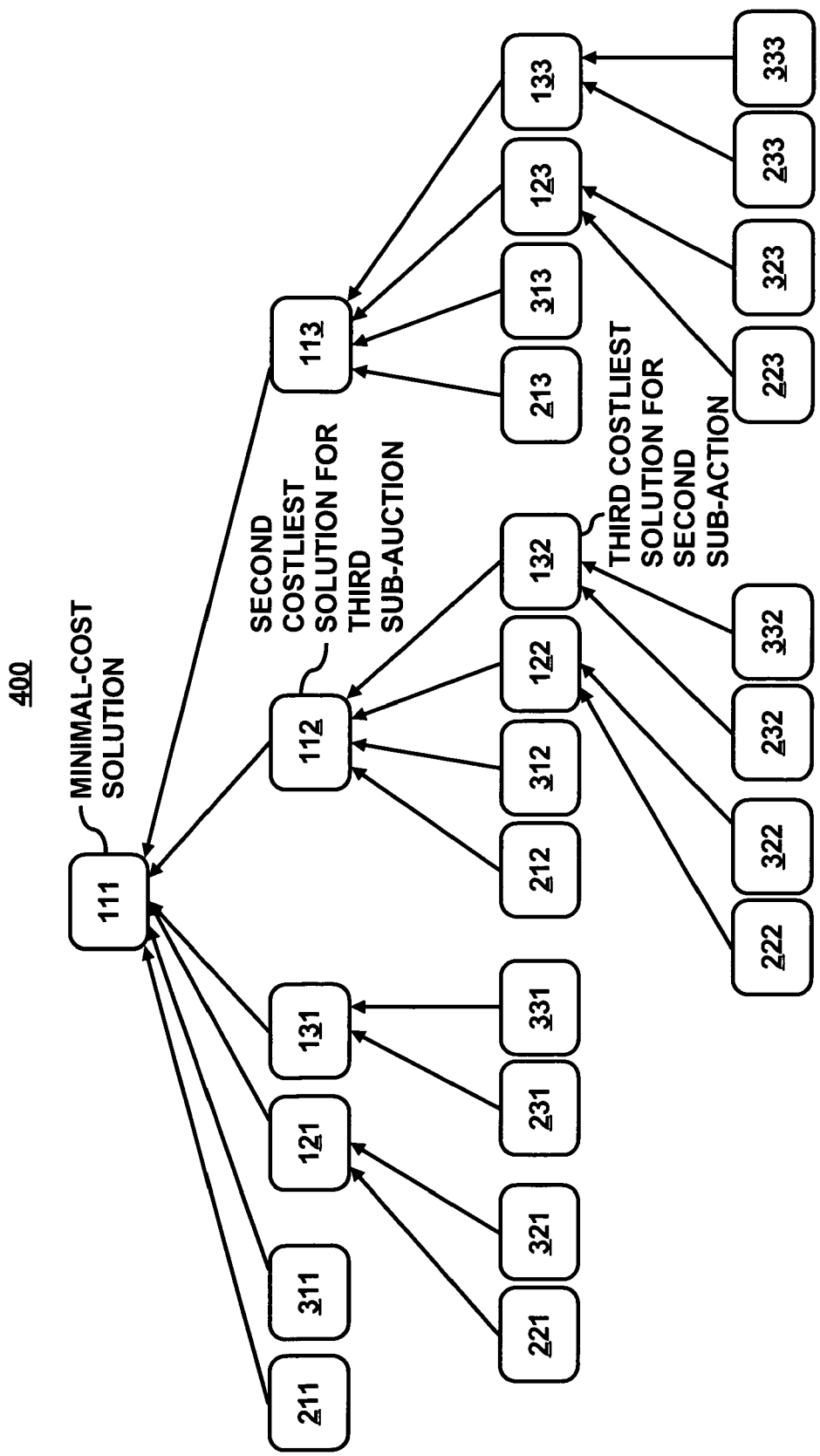
FIG. 4 shows a tree-structured search space explored by a K-shortest paths algorithm, according to an embodiment.

Referring to FIG. 4, a tree relationship can be established to depict all the paths between the source and destination nodes of a graph, such as the graph 300. FIG. 4 illustrates a heap-ordered tree 400 including a heap of paths for the example described above for the three separate individual-item sub-auctions for the three item types X, Y and Z. The heap-ordered tree 400 depicts only the paths between the source and destination nodes, not all the paths between all node pairs in the graph 300.

The heap-ordered tree 400 represents a tree-structured search space explored by a KSP algorithm. The tree 400 is a graphical representation of all the paths between the source node 310 and the destination node 340, referring again to the example described above for the three separate individual-item sub-auctions for the three item types X, Y and Z. The tree 400 comprises a root, corresponding to a shortest path between the source node 310 and the destination node 340, and a plurality of child nodes that represent other paths between the source node 310 and the destination node 340. For example, 112 is a child node. The tree 400 includes a total of 27 nodes, corresponding to the 27 solutions calculated for the example described above for the three sub-auctions for the item types X, Y and Z.

The paths in the tree 400 are arranged in a heap-ordered tree in which the child nodes are branches of the parent nodes, with the shortest path at the root of the tree 400. As described in further detail below, the root of the tree represents the cheapest or least costly solution for an agent at an auction, such as a procurement auction. The root of the heap-ordered tree 400 is "111" which represents the minimal-cost solution obtained by choosing the cheapest individual-item sub-auction solution for each of the three sub-auctions for the item types X, Y and Z. The child nodes represent more costly solutions for the agent, such as for a buyer or a seller, at the auction.

Each of the 27 numbered nodes of the tree 400 represents a rank of the 27 solutions determined for the example described above. Each of the 27 solutions includes three individual-item sub-auction solutions determined for the three individual-item sub-auctions for the item types X, Y and Z. In addition, each of the nodes represents a path that includes the three individual-item sub-auction solutions. For example, the node numbered as "312" represents a path corresponding to the third-cheapest individual-item sub-auction solution (the "3" of "312") for the first sub-auction, the cheapest individual-item sub-auction solution (the "1" of "312") for the second sub-auction, and the second-cheapest individual-item sub-auction solution (the "2" of "312") for the third sub-auction. The underscores in each node represent an edge that differs from the parent node. For example, the "3" is underlined in "312" because that is the edge that differs from its parent node "112."

As described above, and with reference to FIG. 4, the root of the tree 400 represents the cheapest or least costly solution for an agent at an auction. The root of the tree also represents the shortest path, which, for example, is associated with the least costly overall solution. The child nodes are associated with more costly solutions for the agent.

In the absence of the side constraints 250, the problem of computing the best solution to the auction WDP that represents minimal cost requires selection of the cheapest individual-item sub-auction solution to each individual-item sub-auction. The minimal-cost solution requires, for example, the minimal total payment that is required of the buyer.

When the constraints 250 shown in FIG. 2 are provided, the problem of computing the K-best solutions 180 to the auction WDP that optimize the objective function 240, such as minimal cost, also requires satisfying the side constraints 250 that are imposed. However, one or more of the side constraints 250 can be difficult for a human decision-maker, such as the buyer or the seller, to articulate. These type of constraints are one example of soft constraints.

A constraint can be hard to articulate because the buyer, for example, cannot provide an explicit description of the constraint, or because the constraint is based upon one or more subjective parameters that are unique to the buyer. For example, a constraint that requires that one or more items be purchased from only one or more sellers that are "generally liked by the buyer" is difficult to articulate, because the criteria that form the basis for what is "generally liked by the buyer" are often subjective to the particular buyer, and subjective criteria are difficult to quantify or explicitly articulate. By informing a buyer how much the buyer is required to pay for a bundle of constraints, the buyer, for example, removes the constraint. For example, upon being informed of the price associated with a bundle of constraints, the buyer can articulate that "I don't want to buy from more than N suppliers." Table 2 is an example of costs for bundle of constraints, such as the cost of being required to use seller A, which is the generally liked seller, for item X.

In some instances, the K-best solutions 180 will not necessarily contain a solution that satisfies each constraint 250 or bundle thereof. In some instances, a buyer or a seller can relax or change one or more of the constraints 250. In such a case, and even if the buyer is able to articulate a constraints, a shortest paths problem can be employed by the solutions module 210 for determining the K-shortest paths of a graph and for determining the relaxed K-best solutions 281 shown in FIG. 2 to the auction WDP based on the total payment ($\Sigma p$) required for the buyer or the seller.

By knowing the K-shortest paths, the buyer or seller is informed of the potential K-best solutions 180, corresponding to the potential winning bids for the procurement auction, based on each total payment ($\Sigma p$) required of the buyer or the seller. In the case of a procurement auction, for example, a cost profile of the potential winning bids can be generated, which describes total payments of the buyer that are due to the one or more sellers.

Figure 5:
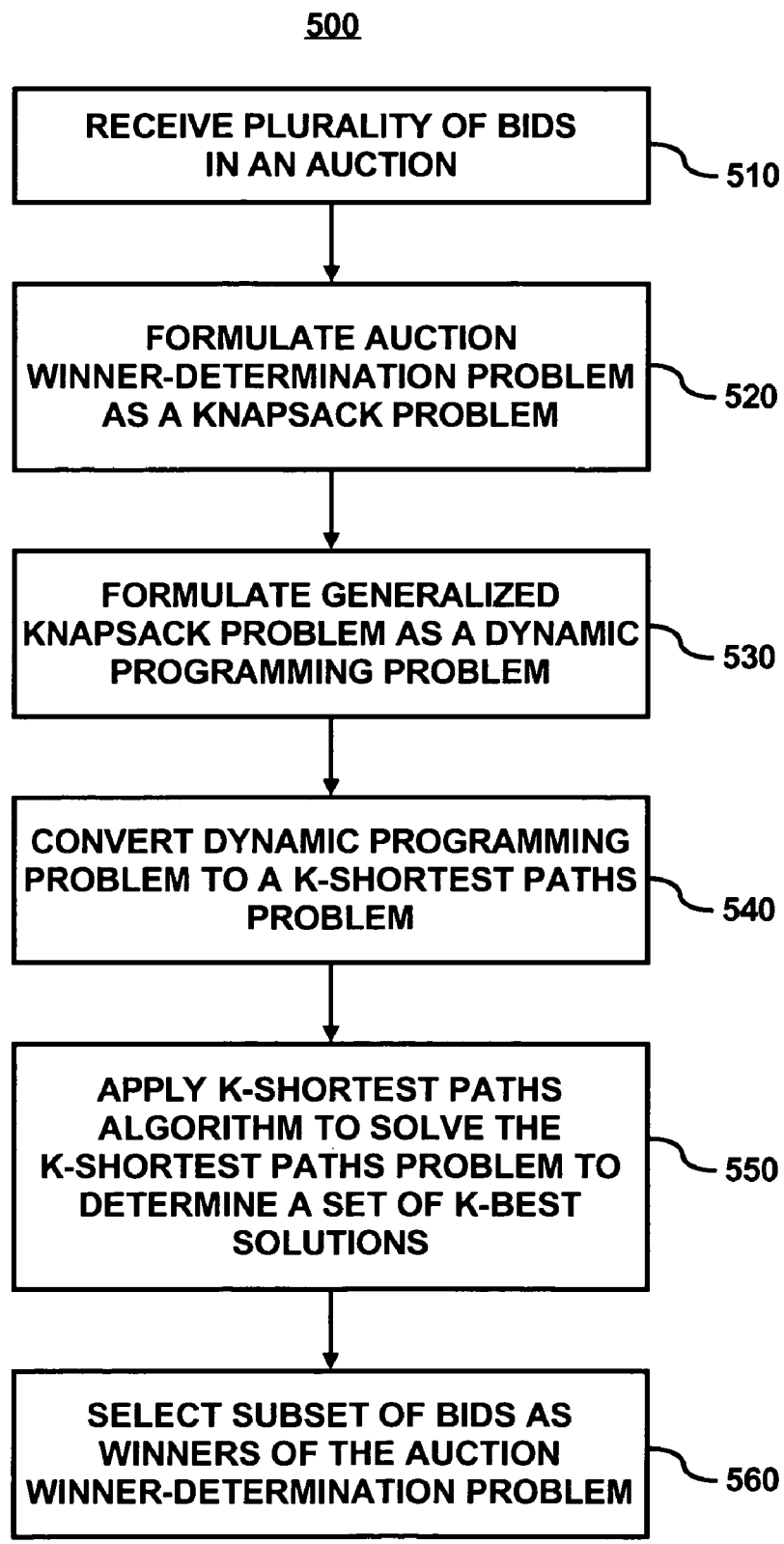
FIG. 5 shows a method, according to an embodiment.

FIG. 5 depicts a flowchart 500 for selecting one or more bids as a solution to an auction WDP, according to an embodiment. FIG. 5 is described with respect to one or more of FIGS. 1-4 by way of example and not limitation.

At step 510, the auction system 130 receives a plurality of bids 120 for one or more goods being auctioned. For example, if a number of items are being acquired in a single auction, such as in a procurement auction, the solutions module 210 shown in FIG. 2 receives one or more bids 120 for satisfying the request for the items being auctioned.

At step 520, the auction WDP is formulated as a knapsack problem. Formulation involves an application or execution of at least one process that results in an expression of a problem, such as the mathematical expression of the knapsack problem. Formulation is operable to be performed manually and/or is operable to be automated. For example, mapping tables are used by the formulation module 220 to map an auction WDP to a corresponding knapsack problem. Examples of corresponding knapsack problems are shown below in table 3. In one example, the mapping tables are populated with values calculated manually using techniques known in the art.

Table 3 below lists examples of three types of auctions and a corresponding type of knapsack problem that is operable to be formulated for each type of auction WDP. The auction WDP for each of the auctions is operable to be expressed as the type of knapsack problem shown in the last column, for example, by the formulation module 220.

TABLE 3

| Auction Type | Knapsack Problem (KP) |
|---|---|
| Single-Good-Type Multi-Unit Double Auction, single-quantity bids | 0-1 KP |
| Single-Good-Type, Multi-Unit Double Auction, fully-expressive bids | Multiple-Choice KP (MCKP) |
| Multi-Unit Combinatorial Auction (multiple types of goods, each available in multiple units; fully-expressive bids) | Multi-Dimensional Multiple-Choice KP (MDMCKP) |

The double auction with single quantity bids, the double auction with unrestricted (fully expressive) bids, and the multi-unit combinatorial auction are examples of three types of auctions. A "fully expressive" bid is one that defines the agent's willingness to pay (or demand to be paid) for each possible outcome of the auction. For example, if there are exactly five units of a good available for sale at an auction, a fully expressive bid defines an agent's willingness to pay for zero units, one unit, two units, three units, four units, or five units. A single-quantity bid, by contrast, defines the agent's willingness to pay for only a single quantity, e.g., three units. 0-1 KP, MCKP, and MDMCKP are known types of knapsack problems. Table 3 shows that the auction WDP for a double auction with single-quantity bids is operable to be expressed as a 0-1 KP. The auction WDP for a double auction, fully-expressive bids is operable to be expressed as a MCKP, and the auction WDP for a multi-unit combinatorial auction is operable to be expressed as a 0-1 KP.

At step 530, the formulation module 220 formulates the knapsack problem as a dynamic programming problem. For example, the formulation module 220 expresses the knapsack problem using well known Bellman equations. Other known processes and algorithms can be used to express the knapsack problem as a dynamic programming problem. In another example, a mapping table, for example, populated manually, is used by the formulation module 220 to formulate the dynamic programming problem from the knapsack problem.

In addition, as shown at step 540, the formulation module 220 converts the dynamic programming problem into a KSP problem. Converting, for example, includes transforming the dynamic programming problem into a KSP problem such that a solution to the KSP problem is also a solution to the dynamic programming problem. Converting the dynamic programming problem into a KSP problem, for example, includes generating a graph, such as shown in FIG. 3, from the mathematical expression of the dynamic programming problem.

At step 550, a KSP algorithm is applied to solve the KSP problem for determining the K-best solutions 180 to the auction WDP. Each of the K-best solutions 180 corresponds to one or more of the bids 120 received by the auction system 130.

At step 560, after determining the K-best solutions 180 to the auction WDP, a subset of the bids 120 is selected for the auction. For example, the K-best solutions are ordered based on the objective function 240, such as most expensive to cheapest, and a solution from the K-best solutions 180 is selected based on the order. For example, the cheapest solution, which corresponds to the last solution in the order in this example, is selected.

The method 500 is one embodiment for computing a set of K-best solutions to an auction WDP from received bids. The set of K-best solutions is operable to be computed without computing all the solutions to the auction WDP. In many situations it is infeasible to compute all the solutions because of time and computing limitations. Thus, computing a set of K-best solutions to an auction WDP without computing all the solutions to the auction WDP is a valuable tool to for a decision-maker engaged in an auction. Furthermore, the method 500 includes one embodiment for transforming an auction winner determination problem into a KSP problem. For example, steps 520-540 are one embodiment for transforming an auction winner determination problem into a KSP problem. Other methods may be performed for determining the KSP problem.

Figure 6:
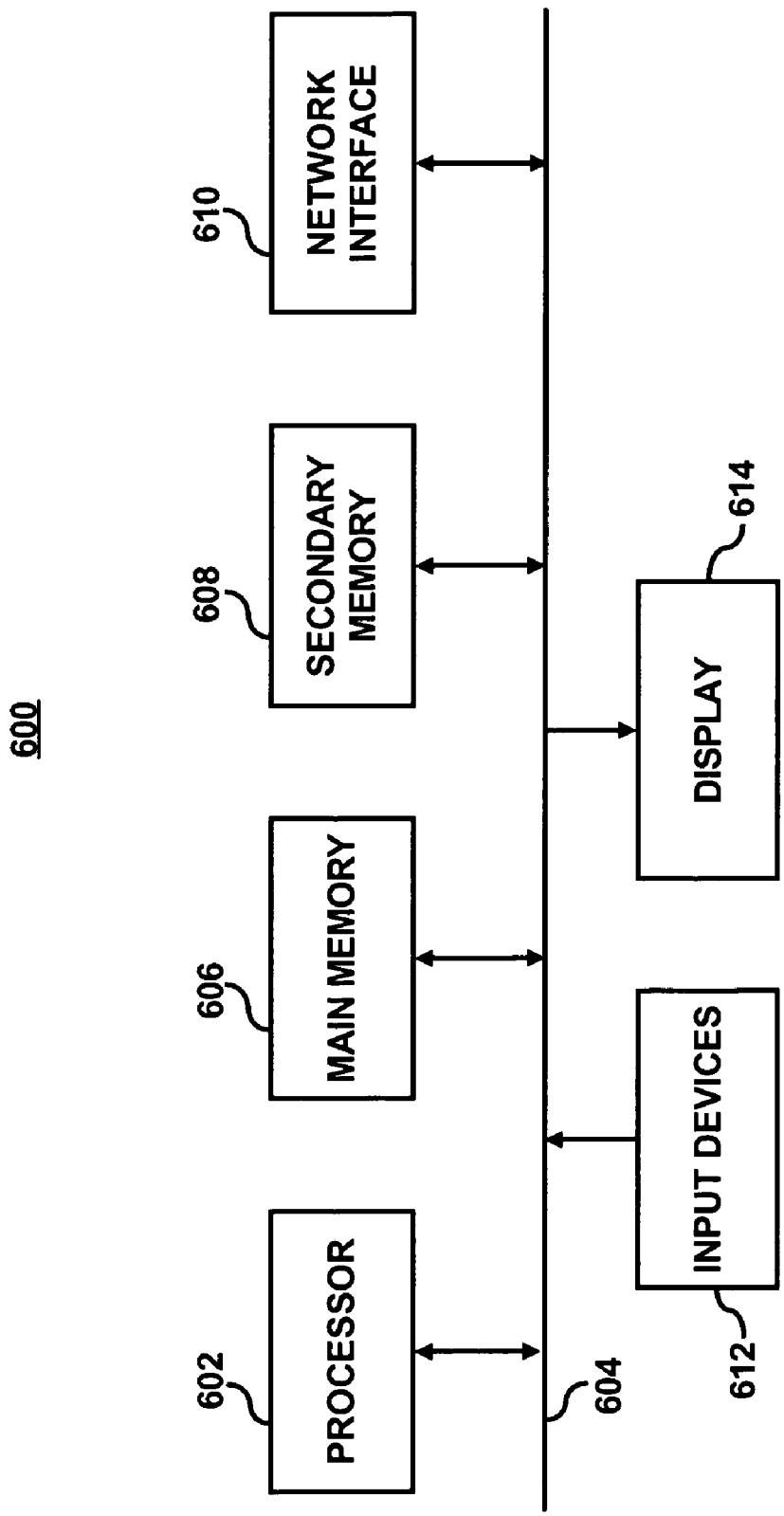
FIG. 6 shows a computer system operable to used as a platform for implementing one or more of the embodiments, according to an embodiment.

FIG. 6 illustrates a block diagram of a general purpose computer system 600 that is operable to be used as a platform for the auction system 130 shown in FIGS. 1 and 2. It will be apparent to one of ordinary skill in the art that a more sophisticated computer system is operable to be used. Furthermore, components can be added or removed from the computer system 600 to provide the desired functionality.

The computer system 600 includes one or more processors, such as processor 602, providing an execution platform for executing software. Commands and data from the processor 602 are communicated over a communication bus 604. The computer system 600 also includes a main memory 606, such as a Random Access Memory (RAM), where software is resident during runtime, and a secondary memory 608. The secondary memory 608 includes, for example, a hard disk drive and/or a removable storage drive representing a floppy diskette drive, a magnetic tape drive, a compact disk drive, etc., or a nonvolatile memory where a copy of the software is stored. In one example, the secondary memory 608 also includes ROM (read only memory), EPROM (erasable, programmable ROM), EEPROM (electrically erasable, programmable ROM). The computer system 600 includes a display 614 and user interfaces comprising one or more input devices 612, such as a keyboard, a mouse, a stylus, and the like. However, the input devices 612 and the display 614 are optional and other shown components. A network interface 610 is provided for communicating with other computer systems.

One or more of the steps of the method 500 and other steps described herein are operable to be implemented as software stored on a computer readable medium, such as the memory 606 and/or 608, and executed on the computer system 600, for example, by the processor 602. In one embodiment, the modules shown in FIG. 2 include software stored on and executed by the computer system 600.

The steps are operable to be embodied by a computer program, which can exist in a variety of forms both active and inactive. For example, they exist as software program(s) comprised of program instructions in source code, object code, executable code or other formats for performing some of the steps. Any of the above can be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of computing a set of K-best solutions to an auction winner-determination problem, the method comprising:
   transforming, by a computer system, the auction winner determination problem to a K-shortest paths problem; and
   a computer system determining a set of K-best solutions to the K-shortest paths problem, wherein the set of K-best solutions are solutions to the auction winner-determination problem,
   wherein the transforming, by a computer system, the auction winner determination problem to a K-shortest paths problem further comprises:
      formulating the auction winner-determination problem as a knapsack problem;
      formulating the knapsack problem as a dynamic programming problem; and
      converting the dynamic programming problem to a K-shortest paths problem.

2. The method of claim 1, wherein determining a set of K-best solutions to the K-shortest paths problem further comprises:
   generating a plurality of relaxed K-best solutions to the auction winner-determination problem.

3. The method of claim 1, further comprising:
   pre-processing the K-shortest paths problem to further selectively determine the set of K-best solutions.

4. The method of claim 1, further comprising:
   analyzing a plurality of edges of a graph whose shortest paths correspond to optimal solutions to the auction winner-determination problem;
   deleting one or more edges from the graph, thereby forming a reduced graph; and
   generating the determined set of K-best solutions based on the reduced graph.

5. The method of claim 4, further comprising:
   generating a set of individual-item sub-auction solutions for each of a plurality of individual-item sub-auctions, wherein each of the set of individual-item sub-auction solutions corresponds to an edge of the graph whose paths correspond to winner determination problem solutions, further wherein a length of each edge represents a cost associated with each individual-item sub-auction solution;
   eliminating at least one of the individual-item sub-auction solutions, such that the graph includes a reduced number of the individual-item sub-auction solutions; and
   generating K-shortest paths in the reduced graph to determine the K-best solutions to the auction winner-determination problem.

6. The method of claim 5, wherein generating the set of individual-item sub-auction solutions further comprises:
   applying one of a recursive process or a non-recursive process equivalent to the recursive process to generate the set of individual-item sub-auction solutions for a procurement auction.

7. The method of claim 1, further comprising:
   selecting at least one acceptable solution from the set of K-best solutions, wherein the at least one acceptable solution allocates an exact number of quantiles requested by a decision-maker at an auction.

8. The method of claim 1, further comprising:
   applying at least one constraint; and
   selecting at least one feasible solution from the set of K-best solutions, wherein the at least one feasible solution satisfies the at least one constraint.

9. The method of claim 8, further comprising:
   associating a price with the at least one constraint.

10. The method of claim 1, further comprising:
    selecting a subset of bids from a plurality of bids as a solution of the winner determination problem.

11. The method of claim 10, wherein selecting the subset of bids from the plurality of bids further comprises:
    minimizing total expenditure of a decision-maker at an auction.

12. The method of claim 10, wherein selecting the subset of bids from the plurality of bids further comprises:
    satisfying at least one constraint of a decision-maker at an auction.

13. The method of claim 10, wherein selecting the subset of bids from the plurality of bids further comprises:
    selecting the subset of bids from a plurality of sellers.

14. The method of claim 1, wherein the set of K-best solutions is generated until a specified number of solutions is obtained, until the value of the objective function exceeds or falls below a defined threshold, or until a limit is reached for computational resources.

15. A method of solving an auction winner-determination problem, the method comprising:
    transforming, by a computer system, the auction winner determination problem to a K-shortest paths problem;

determining, by a computer system, K-shortest paths to the shortest paths problem, wherein the K-shortest paths are a set of relaxed K-best solutions to the auction winner-determination problem; and selecting one of the K-best solutions, wherein the selected K-best solution is a subset of bids from the plurality of bids that is determined to be a winner of the auction winner-determination problem, wherein the transforming, by a computer system, the auction winner determination problem to a K-shortest paths problem further comprises:

formulating the auction winner-determination problem as a knapsack problem;

formulating the knapsack problem as a dynamic programming problem; and converting the dynamic programming problem to a K-shortest paths problem.

16. The method of claim 15, wherein transforming the auction winner determination problem to a K-shortest paths problem further comprises:

receiving a plurality of bids.

17. The method of claim 16, wherein receiving the plurality of bids further comprises:

receiving at least one bid that encodes at least one of a volume discount and a volume surcharge.

18. The method of claim 15, further comprising:

pre-processing the K-shortest paths problem to further selectively determine the set of relaxed K-best solutions.

19. The method of claim 18, further comprising:

analyzing a plurality of edges of a graph;

reducing the number of edges of the graph; and generating the determined set of relaxed K-best solutions based on the reduced number of edges of the graph.

20. The method of claim 19, further comprising:

applying a recursive algorithm to generate a set of individual-item sub-auction solutions for each of a plurality of individual-item sub-auctions, wherein each of the set of individual-item sub-auction solutions corresponds to an edge of a graph, further wherein a length of each edge represents a cost associated with each individual-item sub-auction solution;

eliminating at least one of the individual-item sub-auction solutions, such that the graph includes a reduced number of the individual-item sub-auction solutions; and generating the determined set of relaxed K-best solutions to solve the shortest paths problem based on the reduced number of the individual-item sub-auction solutions.

21. The method of claim 15, wherein selecting one of the K-best solutions further comprises:

selecting at least one feasible solution from the set of relaxed K-best solutions to the auction winner-determination problem, wherein the at least one feasible solution satisfies all constraints.

22. The method of claim 21, wherein selecting the at least one feasible solution from the set of relaxed K-best solutions further comprises:

selecting the at least one feasible solution that satisfies at least one of a linear constraint and a non-linear constraint.

23. The method of claim 22, further comprising:

associating a price with the at least one of the linear constraint and the non-linear constraint.

24. The method of claim 15, wherein selecting one of the K-best solutions further comprises:

selecting the subset of bids for clearing at least one of a plurality of single-item and multi-item procurement auctions.

25. A system, comprising:

a first module, when executed by a processor, operable to receive information from at least one buyer and at least one seller, wherein the at least one buyer and the at least one seller are engaged in an auction;

a second module, when executed by the processor, operable to formulate a winner-determination problem for the auction as a knapsack problem, formulate the knapsack problem as a dynamic programming problem and convert the dynamic programming problem to a shortest paths problem; and a third module, when executed by the processor, operable to compute K-shortest paths for the shortest paths problem, wherein the K-shortest paths correspond to the K-best solutions to the winner-determination problem;

wherein the first, the second, the third modules are stored on one or more non-transitory computer readable media.

26. A method, comprising:

receiving a request from a buyer for purchasing items at an auction;

transmitting the request to a plurality of sellers;

receiving a plurality of bids from the plurality of sellers;

formulating, using a computer system, an auction winner-determination problem for the auction as a knapsack problem;

formulating, using the computer system, the knapsack problem as a dynamic programming problem;

converting, using the computer system, the dynamic programming problem to a shortest paths problem; and solving, using the computer system, the K-shortest paths problem to determine a set of K-best solutions to the auction winner-determination problem.

27. A computer system, comprising:

means for receiving receive information from at least one buyer and at least one seller, wherein the at least one buyer and the at least one seller are engaged in an auction;

means for formulating a winner-determination problem for the auction as a knapsack problem, for formulating the knapsack problem as a dynamic programming problem and for converting the dynamic programming problem to a shortest paths problem; and means for solving the shortest paths problem to determine K-shortest paths that correspond to K-best solutions to the winner-determination problem.

28. A non-transitory computer readable medium upon which is stored a computer program including instructions which when executed by a processor cause the processor to perform the following comprising:

formulating an auction winner-determination problem as a knapsack problem;

formulating the knapsack problem as a dynamic programming problem;

converting the dynamic programming problem to a K-shortest paths problem; and solving the K-shortest paths problem to determine a set of K-best solutions to the auction winner-determination problem.

29. A method of computing at least one solution to an auction winner-determination problem, the method comprising:

receiving a plurality of bids in an auction;

a computer system computing a set of K-best solutions to an auction winner-determination problem for the auction using the plurality of bids without computing all solutions to the auction winner-determination problem; and computing the auction winner determination problem to a K-shortest paths problem, wherein the computing the auction winner determination problem to a K-shortest paths problem further comprises:
formulating the auction winner-determination problem as a knapsack problem;
formulating the knapsack problem as a dynamic programming problem; and
converting the dynamic programming problem to a K-shortest paths problem.

30. The method of claim 29, further comprising:
sorting the K-best solutions in an order based on predetermined criteria; and selecting one of the K-best solutions as a winner of the auction based on the order.

* * * * *